United States Patent
Kato et al.

(10) Patent No.: US 6,339,204 B1
(45) Date of Patent: Jan. 15, 2002

(54) APPARATUS FOR ASSEMBLING FLOOR OF VEHICLE

(75) Inventors: Chitoshi Kato; Tadashi Tobita; Takeshi Nakamura; Takashi Nakanishi, all of Tochigi-ken; Takatoshi Hattori, Mie-ken; Shoji Doi; Tetsuro Yamanobe, both of Tochigi-ken, all of (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/686,138

(22) Filed: Oct. 11, 2000

(30) Foreign Application Priority Data

| Nov. 18, 1999 | (JP) | ............................................. | 11-328165 |
| Nov. 18, 1999 | (JP) | ............................................. | 11-328266 |
| Nov. 18, 1999 | (JP) | ............................................. | 11-328267 |
| Mar. 7, 2000 | (JP) | ............................................. | 12-062198 |

(51) Int. Cl.⁷ .............................................. B23K 11/10
(52) U.S. Cl. ................ 219/86.7; 219/86.24; 219/86.25; 901/42
(58) Field of Search .......................... 219/86.25, 86.24, 219/117.1, 86.7; 483/16; 901/42

(56) References Cited

U.S. PATENT DOCUMENTS

| 4,637,121 A | * | 1/1987 | Wortmann ..................... 483/16 |
| 4,737,611 A | * | 4/1988 | Humblot ................... 219/86.25 |
| 4,896,014 A | * | 1/1990 | Sakai et al. ............... 219/86.25 |
| 5,548,096 A | * | 8/1996 | Akasaka et al. .......... 219/86.25 |
| 6,008,471 A | * | 12/1999 | Alborante ................ 219/86.24 |

FOREIGN PATENT DOCUMENTS

| GB | 0027781.4 | 1/1989 |
| JP | 4-193433 | 7/1992 |

* cited by examiner

*Primary Examiner*—Clifford C. Shaw
(74) *Attorney, Agent, or Firm*—Armstrong, Westerman, Hattori, McLeland & Naughton, LLP (57) ABSTRACT

The floor of a motor vehicle which is assembled in a floor assembly station is transported to a subsequent station using at least two welding robots on each lateral side of the floor assembly station. These welding robots are constituted into dual-purpose welding robots for performing both welding work and transporting work. After the assembling of the floor has been finished, the floor is supported at four lateral and longitudinal jack-up points through the workpiece receiving member by the cooperation of these dual-purpose welding robots, and is transported from the floor assembly station to the subsequent station.

6 Claims, 10 Drawing Sheets

APPARATUS FOR ASSEMBLING FLOOR OF VEHICLE

BACKGROUND OF THE INVENTION

1. Field of the Invention

The present invention relates to an apparatus for assembling a floor in which a floor of a vehicle such as a motor vehicle is assembled by combining a plurality of workpieces which are made up of a front component constituting an engine room, a front floor constituting a floor surface of a vehicle compartment, a rear floor constituting a floor surface of a trunk room, or the like.

2. Description of Related Art

As this kind of apparatus for assembling a floor of a vehicle, there has been known the following. Namely, the apparatus comprises: a floor assembly station; a setting jig which is disposed in the floor assembly station and which positions and supports a plurality of workpieces constituting the floor of the vehicle; and a plurality of welding robots disposed on each lateral side of the floor assembly station, each of the welding robots having a welding gun mounted on an operating end thereof such that a plurality of workpieces on the setting jig are combined by welding to form the floor (see Published Unexamined Japanese Patent Application No. 193433/1992).

In this apparatus, the floor assembled in the floor assembly station is transferred by a transfer apparatus such as a transfer bar, or the like, to a station which lies ahead to perform the next step of assembling. By providing the transfer apparatus as explained above, the equipment cost becomes high.

There is also known the following apparatus in Published Examined Japanese Patent Application No. 6072/1989. In this apparatus, a welding robot is provided with a joint portion to which a workpiece holding device can be coupled. After the welding of the workpiece has been finished, the workpiece holding device is coupled to the joint portion and the workpiece is held by a plurality of clamping members provided in the workpiece holding device. The workpiece is thus transferred to the next station by the welding robot.

It is considered to apply this kind of art to the apparatus for assembling a floor. Namely, among a plurality of welding robots which are disposed on both lateral sides of the floor assembly station, one welding robot is provided with a joint portion to which a holding device for the floor can be coupled. After the assembling of the floor has been finished, the holding device is coupled to the joint portion. The floor is then supported by the holding device for transportation from the floor assembly station to the next station by means of a single welding robot.

However, since the floor is large in size and weight, it is difficult to stably transport it with a single welding robot. In addition, after the floor has been assembled, the holding device must be coupled to the joint portion before the floor is transported. Therefore, the time required to couple the holding device becomes a loss in time, with the result that the cycle time becomes longer. Alternatively, if the holding device is kept coupled to the welding robot, the holding device interferes with the floor during the assembly work of the floor. Therefore, the holding device must be removed out of the welding robot during the assembly work.

In view of the above-described points, the present invention has an object of providing an apparatus for assembling a floor of a vehicle in which the floor can be transported with welding robots, whereby the equipment cost can be reduced by deleting the transporting apparatus.

SUMMARY OF THE INVENTION

In order to attain the above and other objects, the present invention is an apparatus for assembling a floor of a vehicle, comprising: a floor assembly station; a setting jig which is disposed in said floor assembly station and which positions and supports a plurality of workpieces constituting the floor of the vehicle; a plurality of welding robots disposed on each lateral side of the floor assembly station, each of the welding robots having a welding gun mounted on an operating end thereof such that a plurality of workpieces on the setting jig are combined by welding to form the floor; wherein at least two welding robots on each lateral side of the floor assembly station, i.e., a total of four welding robots, among the welding robots disposed in the floor assembly station, are provided on each operating end thereof with a workpiece receiving member in a certain positional relationship with the welding gun, whereby the four welding robots are constituted into dual-purpose welding robots for both welding and transporting; and wherein the floor is transported by cooperation of the dual-purpose welding robots from the floor assembly station to a subsequent station in which a subsequent assembling step is performed, the floor being transported in a state of being supported through the workpiece receiving members at least at four longitudinal and lateral positions of the floor.

According to the present invention, at least two welding robots on each lateral side of the floor assembly station, i.e., a total of four welding robots, are constituted into dual-purpose welding robots for performing both welding work and transporting work, and the floor is supported through the workpiece receiving member at least at four longitudinal and lateral positions. Therefore, even if the floor is large in size and weight, it can be transported in a stable manner. In addition, since the workpiece receiving members may support only part of the floor, they can be formed small in size. Therefore, even in a state in which the workpiece receiving member remains mounted on the operating end of the robot, the assembly work of the floor can be performed without interference of the workpiece receiving member with the floor. Right after the floor has been assembled, the floor can be supported by the workpiece receiving members and can therefore be quickly transported.

The floor is provided with a jack-up point at each of four longitudinal and lateral positions, the jack-up point being for applying a jack at the time of jacking up the vehicle. Since the jack-up point is high in rigidity, the stability in supporting the floor improves if each of the workpiece receiving members of the dual-purpose welding robots supports each of the jack-up points of the floor. In this case, it is preferable to arrange the workpiece receiving member of at least one of the dual-purpose welding robots to support a corresponding jack-up point by aligning the corresponding jack-up point in both longitudinal and lateral directions, to thereby prevent the floor from deviating in position during transportation.

Preferably, the welding gun is mounted, through a supporting frame, on a wrist of three-axis construction provided at a front end of a robot arm of each of the dual-purpose welding robots, wherein the supporting frame is made up of: that first side frame on one side which extends in a longitudinal direction at a right angle to an axis of rotation of a wrist member provided at a front end of the wrist and which is coupled to the wrist member; a second side frame on a side opposite to, and parallel with, the first side frame; and cross members which combine both the first and second side frames, wherein the welding gun is mounted between the first and second side frames such that a gun arm projects in one longitudinal direction of the first and second side frames, and wherein the workpiece receiving member is fixed to an outer side surface of the second side frame. According to this arrangement, when the floor is supported, the load which operates on the workpiece receiving member is received by the supporting frame. Therefore, the load from the workpiece receiving member does not operate on the welding gun, thereby preventing the welding gun from being adversely affected. In addition, the workpiece receiving member is fixed to that surface of the supporting frame which faces the direction different from the direction in which the gun arm projects. Therefore, the welding work of the workpiece can be performed without interference of the workpiece receiving member with the workpiece. Also, the workpiece can be supported through the workpiece receiving member without interference of the gun arm with the workpiece.

Further, preferably, a position of fixing the workpiece receiving member is set such that, when the floor is supported by the workpiece receiving member, an operation line of a load to operate on the workpiece receiving member coincides with a vertical plane which includes the axis of rotation of the wrist member. The wrist member can thus be prevented from being subject to a moment of rotation when the workpiece is supported. The stability in supporting the workpiece can advantageously be improved.

When the welding work has been repeated, the electrode tip (i.e., the front end of the electrode) of the welding gun will get out of shape. Therefore, it becomes necessary dress (or reform) the electrode tip from time to time. As a conventional method of dressing the electrode tip of a welding robot which performs only the welding work of a workpiece, there is disclosed the following art in Japanese Published Unexamined Patent Application No. 228678/1989. Namely, an electrode tip dressing device is disposed close to a position in which a welding robot is disposed. While the workpiece is being transported after the welding work of the workpiece has been finished, the welding robot is operated such that the electrode tip of the welding gun comes into contact with the electrode tip dressing device, whereby the electrode tip is dressed. However, in that dual-purpose welding robot of the present invention which performs the welding work and the transporting work, the dressing of the electrode tip cannot be performed while the workpiece is being transported. Therefore, a time for electrode tip dressing must be separately reserved, resulting in a hindrance to an attempt to improve the workability. In this case, preferably, the apparatus further comprises travel bases which are provided so as to be reciprocated between the floor assembly station and the subsequent station, each of the dual-purpose welding robots being mounted on each of the travel bases; an electrode tip dressing device which is movable together with each of the travel bases, wherein, when each of the travel bases is moved from the subsequent station back to the floor assembly station, each of the dual-purpose welding robots is operated such that a welding electrode of each of the welding guns contacts each of the electrode tip dressing devices to thereby dress each of the electrode tips. It is thus not necessary to separately reserving a time for electrode tip dressing. The productivity can thus be improved.

Conventionally, there is known the following prior art in Japanese Published Unexamined Patent Application No. 193433/1992. Namely, each workpiece which is made up of a front component, a front floor, and a rear floor is transported by a transporting means into a workpiece feeding section which is located above one lateral side of a floor assembly station. They are then transferred by each of transfer means onto a setting jig in a predetermined positional relationship with one another.

In this prior art, each of the transfer means is made up of: a lifting frame which is moved up and down along supporting columns which are vertically provided on the other lateral side of the floor assembly station; a movable frame which can be shifted between a position right above the floor assembly station and said one lateral side of the floor assembly station and which is supported by the lifting frame; and a holding device which is suspended from the movable frame so as to be movable back and forth. Each of the workpieces transported into the workpiece feeding section is picked up from the transporting means by holding it with the holding device. Thereafter, by the movement of each of the movable frames, each of the workpieces is shifted to a position right above the floor assembly station, and is then lowered by the movement of the lifting frame. Then, by the back and forth movement of the holding device, each of the workpieces is aligned so as to be in a predetermined positional relationship with one another, thereby setting each of the workpieces onto the setting jig. In this prior art, however, each of the transfer means must be constituted as an exclusive equipment (i.e., equipment which is used only for a specific workpiece). This results in a higher equipment cost. In addition, on both lateral sides of the floor assembly station, there are disposed welding robots for combining by welding the workpieces on the setting jig. In this prior art, there are vertically disposed, on the other side of the floor assembly station, supporting columns for the transfer means. Therefore, there is a disadvantage in that the movable range of the welding robots to be disposed on the other side is restricted.

In such a case, preferably, the apparatus further comprises: transporting means for transporting three workpieces of a front component, a front floor, and a rear floor which constitute the floor of the vehicle into a workpiece feeding section which is located above one lateral side of the floor assembly station; an overhead frame which is provided above the other lateral side of the floor assembly station; three transfer robots for three workpieces of the front component, the front floor, and the rear floor, disposed on the overhead frame in a longitudinally spaced relationship from one another, each of the transfer robots comprising: a rotary base rotatable about a vertical axial line; a first arm coupled to the rotary base through a first joint; a second arm swingably coupled to a front end of the first arm through a second joint; a wrist of three-axis construction at a front end of the second arm; and a workpiece holding device for holding each of the workpieces attached to the wrist, wherein each of the workpieces transported into the workpiece feeding section: is picked up by each of the transfer robots; is rotated by the movement of the rotary base of each of the transfer robots into a position which lies above a free space between the workpiece feeding section and the overhead frame; is lowered through the free space for alignment into a predetermined positional relationship with one another in a position right above the setting jig; and is put in position onto the setting jig. According to this arrangement, a six-axis general-purpose robot can be used as the transfer robot. Therefore, there is no need of constituting the transfer means as an exclusive equipment, resulting in a lower equipment cost. Further, since the transfer robot is disposed on the overhead frame, the movable range of the welding robot to be disposed on the side portion of the floor assembly station can be secured wide enough in the free space below the overhead frame.

As an alternative arrangement, the following may also be considered. Namely, after each of the workpieces which are transported into the workpiece feeding section is picked up by each of the transfer robots, each of the workpieces is laterally moved by the movements of the first and second arms of each of the transfer robots into a position which lies above the free space between the workpiece feeding section and the overhead frame, and is then lowered through this free space. However, if a general-purpose small robot with a short arm length is used to reduce the weight and cost of the transfer robot, the workpiece holding device and the workpiece will interfere with the first joint of the transfer robot when the workpiece is moved laterally. As a result, the workpiece cannot be set in position onto the setting jig.

On the other hand, if the workpiece is moved by rotation of the rotary base into the position above and facing the free space as described above, even if a small general-purpose robot is used as the transfer robot, the workpiece and the workpiece holding device can be moved to the free space, while keeping them away from the first joint, by extending the first arm and the second arm. In this manner, the workpiece can be transferred to the setting jig through the free space without interference with the first joint.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
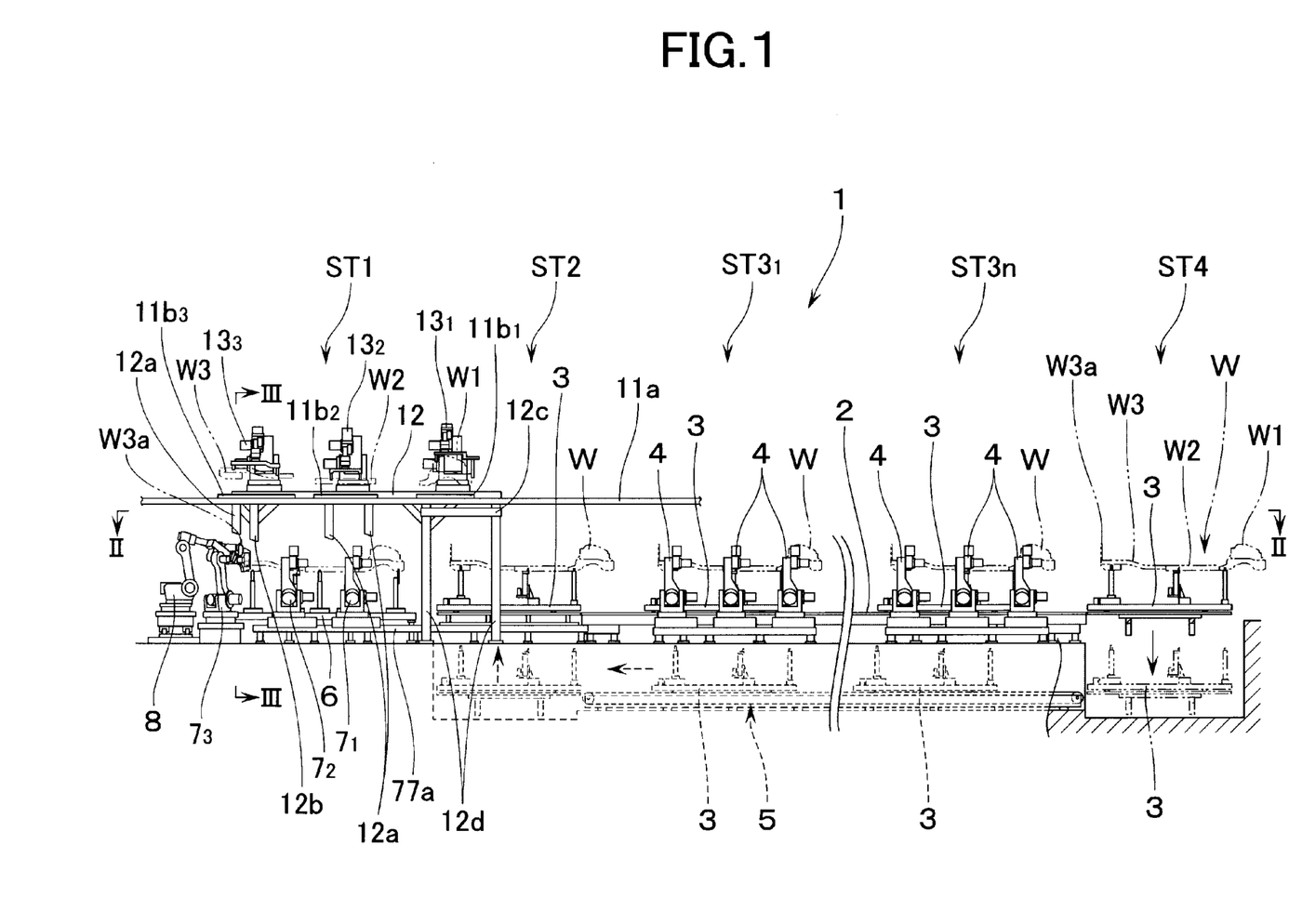
FIG. 1 is a side view of an apparatus for assembling a floor according to the present invention.
Figure 2:
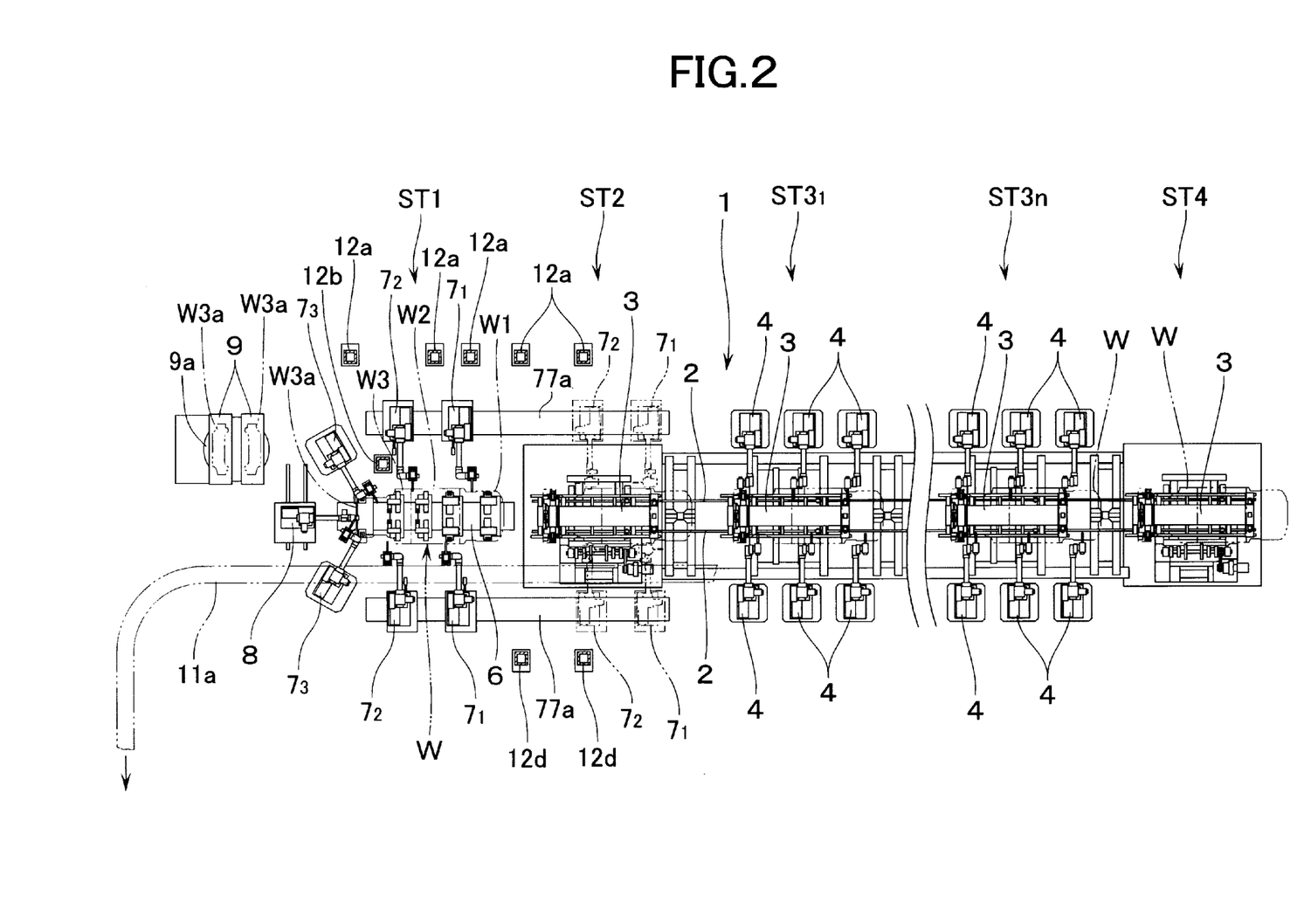
FIG. 2 is a plan view of the apparatus for assembling a floor taken along the line II—II in FIG. 1.

FIGS. 1 and 2 show an apparatus 1 for assembling a floor of a motor vehicle. This apparatus 1 for assembling a floor is made up of: an assembly station ST1 for assembling a front component W1, a front floor W2, and a rear floor W3 into a floor W by welding them together; and a reinforcing welding line which lies in front of the assembly station ST1 (i.e., on a downstream side of the assembly station ST1 as seen in the flow of the assembly work). The reinforcing welding line is made up of: a feeding station ST2; a plurality of reinforcing welding stations $ST3_1$–$ST3_n$; and a discharge station ST4, all being disposed in series in a longitudinal direction. The reinforcing welding line is provided with carts 3 which are intermittently sent out along guide rails 2 from the feeding station ST2 to the discharge station ST4. The floor W which has been assembled in the floor assembly station ST1 is set onto the cart 3 in the feeding station ST2. Reinforcing welding is performed on the floor W in the reinforcing welding stations $ST3_1$–$ST3_n$ by means of a plurality of welding robots 4 which are disposed on both lateral sides of the reinforcing welding stations $ST3_1$–$ST3_n$. In the discharge station ST4, the floor W is picked up from the cart 3 by a transfer apparatus (not illustrated), and the empty cart 3 is returned to the feeding station ST1 through a return path 5 which is provided below the ground level.

In the floor assembly station ST1, there is disposed a setting jig 6 which positions and supports the front component W1, the front floor W2, and the rear floor W3. Further, on each of the lateral sides of the floor assembly station ST1, there are disposed three longitudinally arranged welding robots $7_1$, $7_2$, $7_3$. A transfer robot 8 for a rear panel W3a is disposed in the rear of the floor assembly station ST1. Further, in a slantingly rearward of the position in which the transfer robot 8 is disposed, there are disposed those pair of tables 9, 9 for the rear panel W3a which are alternately rotated in position by a turn table 9a between a rear side feeding position and a front side pick-up position. The rear panel W3a is manually mounted onto the table 9 which is in the feeding position. The table 9 is then reversed in position to the pick-up position, and the rear panel W3a is then picked up by the transfer robot 8.

Figure 3:
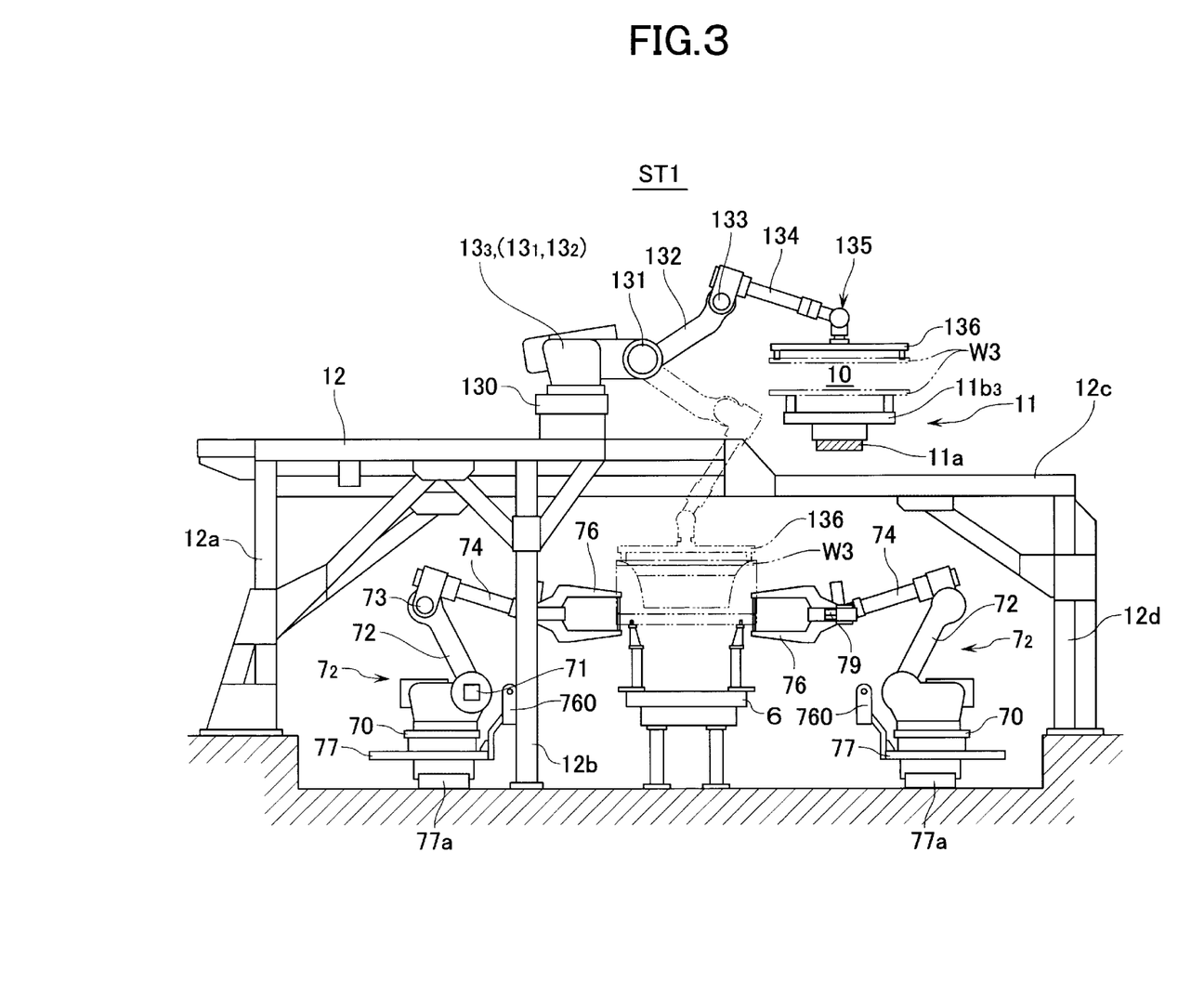
FIG. 3 is a front view of a floor assembly station taken along the line III—III in FIG. 1.
Figure 4A:
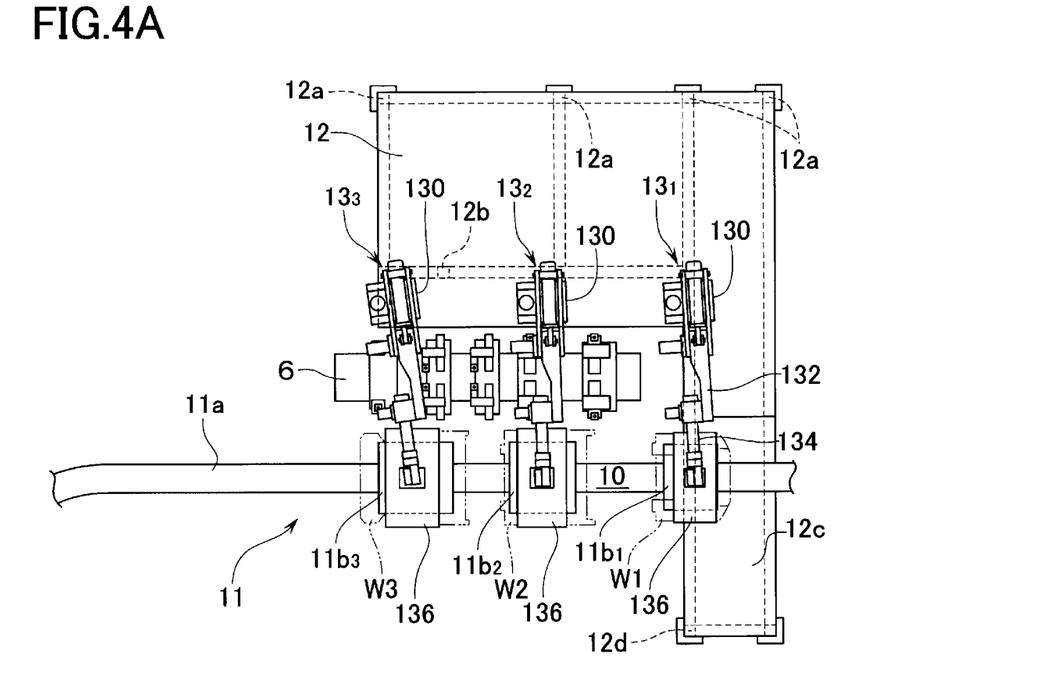
FIG. 4A is a plan view showing the state of a transfer robot at the time of picking up a workpiece.
Figure 4B:
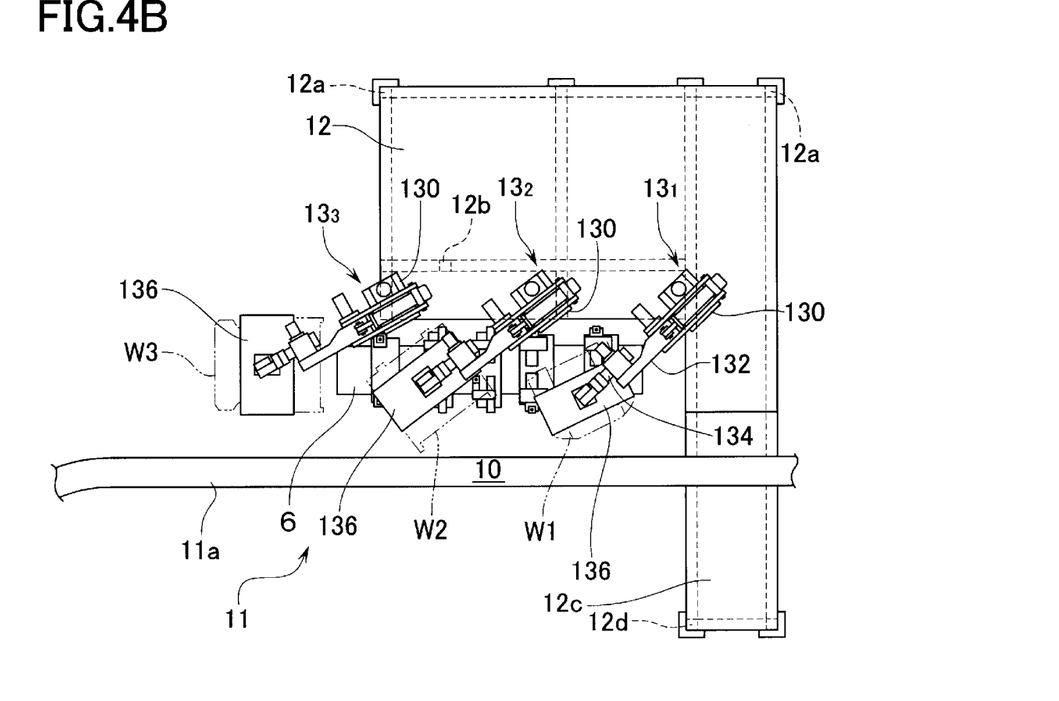
FIG. 4B is a plan view of the transfer robot at the time of turning the workpiece.

The front component W1, the front floor W2 and the rear floor W3 are fed from an upper portion of the floor assembly station ST1 and are set onto the setting jig 6. As shown in FIGS. 1, 3 and 4, the front component W1, the front floor W2 and the rear floor W3 are transported by a transfer means 11 into a workpiece feeding section 10 above one lateral side of the floor assembly station ST1. An overhead frame 12 is provided to bridge over the other lateral side of the floor assembly station ST1. A total of three transfer robots $13_1$, $13_2$, $13_3$ for the front component W1, the front floor W2 and the rear floor W3, respectively, are disposed on the overhead frame 12 in a manner longitudinally spaced from one another. The front component W1, the front floor W2 and the rear floor W3 transferred into the workpiece feeding section 10 are respectively picked up by these transfer robots $13_1$, $13_2$, $13_3$ and are fed into the floor assembly station ST1 from an upper side.

The transfer means 11 is made up of: an overhead conveyor rail 11a which passes through the workpiece feeding section 10; and those transfer carts $11b_1$, $11b_2$, $11b_3$ for the front component W1, the front floor W2 and the rear floor W3, respectively, which move along the conveyor rail 11a. Though not illustrated, the overhead conveyor rail 11a is branched on a downstream side of the workpiece feeding section 10 into three rails which pass through respective workpiece assembly lines for the front component W1, the front floor W2 and the rear floor W3. The transfer carts $11b_1$, $11b_2$, $11b_3$ are moved to the corresponding workpiece assembly lines and the workpieces are respectively mounted on the transfer carts $11b_1$, $11b_2$, $11b_3$. These transfer carts $11b_1$, $11b_2$, $11b_3$ are thereafter joined or merged together and are sent to the workpiece feeding section 10.

Each of the transfer robots $13_1$, $13_2$, $13_3$ is constituted by a six-axis general-purpose robot which is made up of: a rotary base 130 which is rotatable about a vertical axial line; a first arm 132 which is swingably coupled to the rotary base 130 through a first joint 131; a second arm 134 which is swingably coupled to the front end of the first arm 132 through a second joint 133; and a three-axis wrist 135 at the front end of the second arm 134. A workpiece holding device 136 for holding each of the workpieces of the front component W1, the front floor W2 and the rear floor W3 is attached to each of the wrists 135.

In feeding these workpieces W1, W2, W3 into the floor assembly station ST1, the arms 132, 134 of each of the transfer robots $13_1$, $13_2$, $13_3$ are extended toward the workpiece feeding section 10 as shown in FIG. 4A. Corresponding workpiece W1, W2, W3 is held by the workpiece holding device 136 and is lifted from each of the transfer carts $11b_1$, $11b_2$, $11b_3$. Then, each of the transfer carts $11b_1$, $11b_2$, $11b_3$ is sent out from the workpiece feeding section 10, and each of the workpieces W1, W2, W3 is shifted to the position above a free space between the workpiece feeding section 10 and the overhead frame 12. Each of the workpieces W1, W2, W3 is thereafter lowered through this free space.

Figure 5:
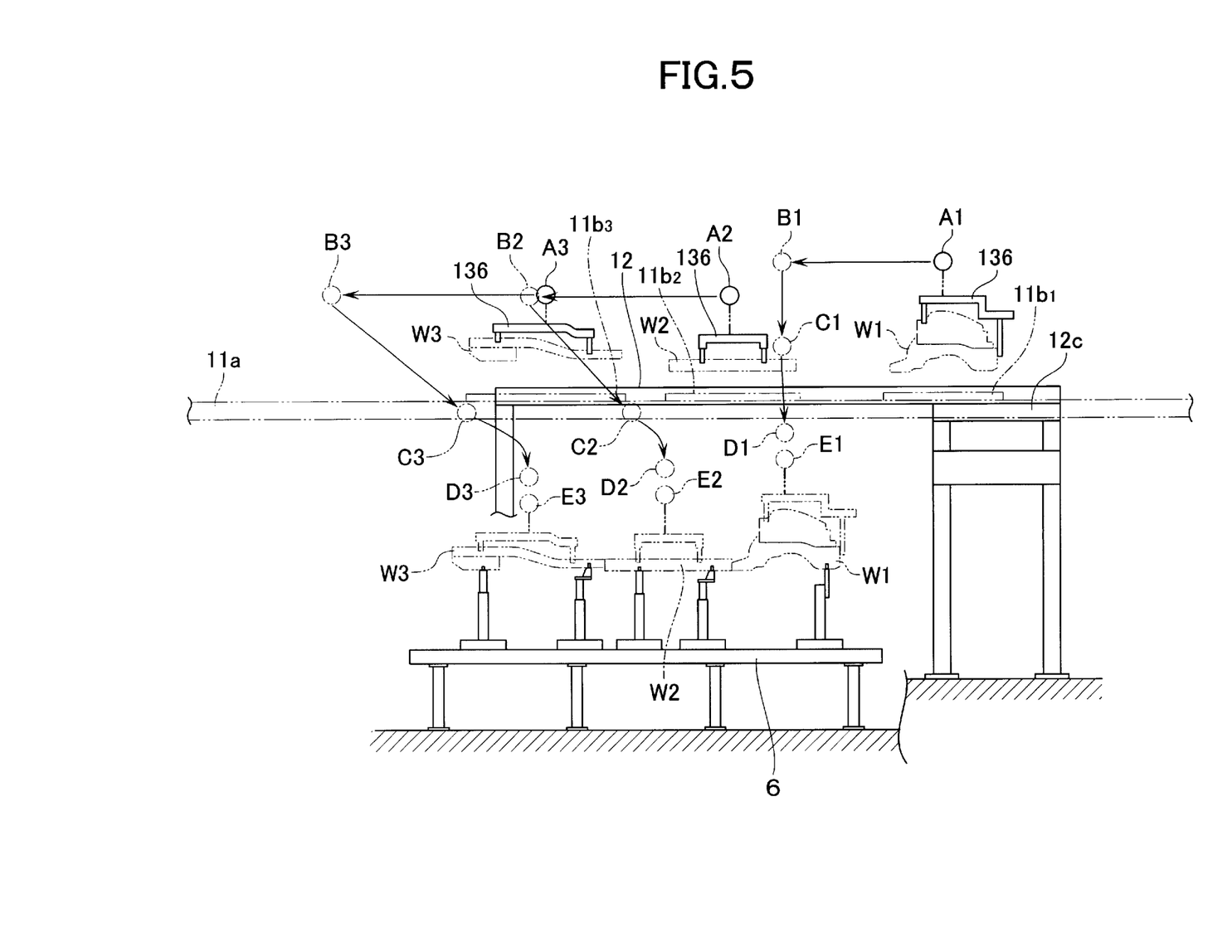
FIG. 5 is a diagram showing the path of movement of the workpiece at the time of feeding the workpiece.

In this case, it is considered to take the following steps. Namely, after each of the workpieces W1, W2, W3 is picked up, it is parallelly moved in a lateral direction through the movement of the arms 132, 134 of each of the transfer robots $13_1$, $13_2$, $13_3$ to thereby shift each of the workpieces W1, W2, W3 to the position above the free space. However, if a small-size robot with a short arm length is used as each of the transfer robots $13_1$, $13_2$, $13_3$, the workpiece holding device 136 and the workpiece will interfere with the first joint 131 of each of the transfer robots $13_1$, $13_2$, $13_3$. Therefore, in this embodiment, after each of the workpieces W1, W2, W3 is picked up, it is moved by rotating or turning it to the position above the free space through the movement of the rotary base 130 of each of the transfer robots $13_1$, $13_2$, $13_3$. According to this arrangement, while the arms 132, 134 are extended and the workpiece holding device 136 and the workpiece are kept away of the first joint 131, each of the workpieces W1, W2, W3 can be shifted to the position above and facing the free space. With reference to FIG. 5, reference characters A1, A2, A3 denote the pick-up positions of each of the workpieces W1, W2, W3, and reference characters B1, B2, B3 denote the rotated positions of each of the workpieces W1, W2, W3 facing the free space. After each of the workpieces W1, W2, W3 is rotated as described hereinabove, it is lowered from the turned position through the free space to thereby transport it to a waiting position designated by reference characters C1, C2, C3. When the floor W has been discharged from the floor assembly station ST1, each of the workpieces W1, W2, W3 is transported from the waiting position to an aligned position as designated by reference characters D1, D2, D3 right above the setting jig 6, whereby each of the workpieces W1, W2, W3 is aligned in a predetermined positional relationship with one another. Then, each of the workpieces W1, W2, W3 is lowered straight down to thereby place it in the setting position on the setting jig 6 as designated by reference characters E1, E2, E3.

The rear floor W3 which is to be transferred by the rearmost third transfer robot $13_3$ is held, at the turning position, in a normal posture which lies along the longitudinal direction. On the other hand, the front floor W2 to be transferred by the intermediate second transfer robot $13_2$ and the front component W1 to be transferred by the front endmost first transfer robot $13_1$, are changed, at the rotated position, into a posture looking toward a slantingly lateral direction in order to prevent them from interfering with the third transfer robot $13_3$ and the second transfer robot $13_2$. It is then returned to the normal posture looking toward the longitudinal direction while it is transported from the rotated position to the waiting position.

Once the front component W1, the front floor W2 and the rear floor W3 are set onto the setting jig 6 as described hereinabove, each of the workpiece holding devices 136 is lifted by the movement of each of the transfer robots $13_1$, $13_2$, $13_3$ to make preparations for the work of feeding the next workpieces W1, W2, W3 into the workpiece feeding section 10. Further, the coupling portion between the front component W1 and the front floor W2 as well as the coupling portion between the front floor W2 and the rear floor W3 are welded by the front endmost first welding robot $7_1$, and the intermediate second welding robot $7_2$, respectively. In addition, by the transfer robot 8, the rear panel W3a is connected to the rear end of the rear floor W3. The connecting portion between the rear panel W3a and the rear floor W3 is welded by the third welding robot $7_3$, whereby the assembling of the floor W is finished.

Each of the welding robots $7_1$, $7_2$, $7_3$ is constituted, like the transfer robots $13_1$, $13_2$, $13_3$, by a six-axis general-purpose robot which is made up of: a rotary base 70 which is rotatable about a vertical axial line; a first arm 72 which is swingably coupled to the rotary base 70 through a first joint 71; a second arm 74 which is swingably coupled to the front end of the first arm 72 through a second joint 73; and a three-axis wrist 75 at the front end of the second arm 74. A welding gun 76 is mounted on the wrist 75.

Once the assembling of the floor W has been finished, the floor W is transported from the floor assembly station ST1 to the feeding station ST2 of the reinforcing welding line, which is defined as a subsequent station in which subsequent assembling step of the floor W is performed. In this case, it is also possible to transfer the floor W by using a transporting device which is used exclusively for this purpose. However, in this embodiment, the first and the second welding robots on the left and the right lateral sides, respectively, i.e., four welding robots in total, $7_1$, $7_1$, $7_2$, $7_2$ are constituted into robots for performing a dual purpose of welding and transporting (hereinafter called "a dual-purpose welding robot). An exclusively used transporting device is thus eliminated to thereby reduce the equipment cost.

Figure 6:
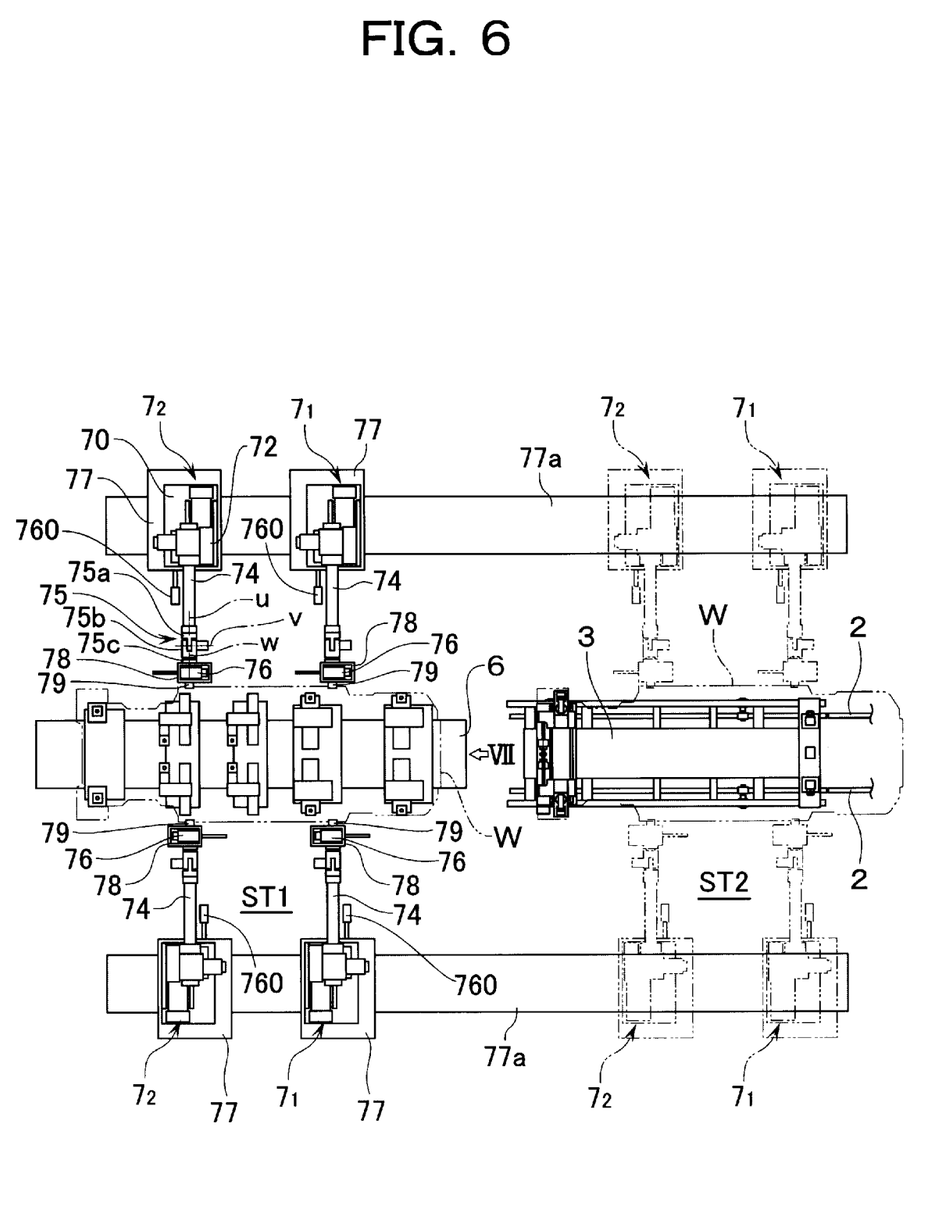
FIG. 6 is a plan view showing the state of a dual-purpose welding robot when the floor is transported.
Figure 7A:
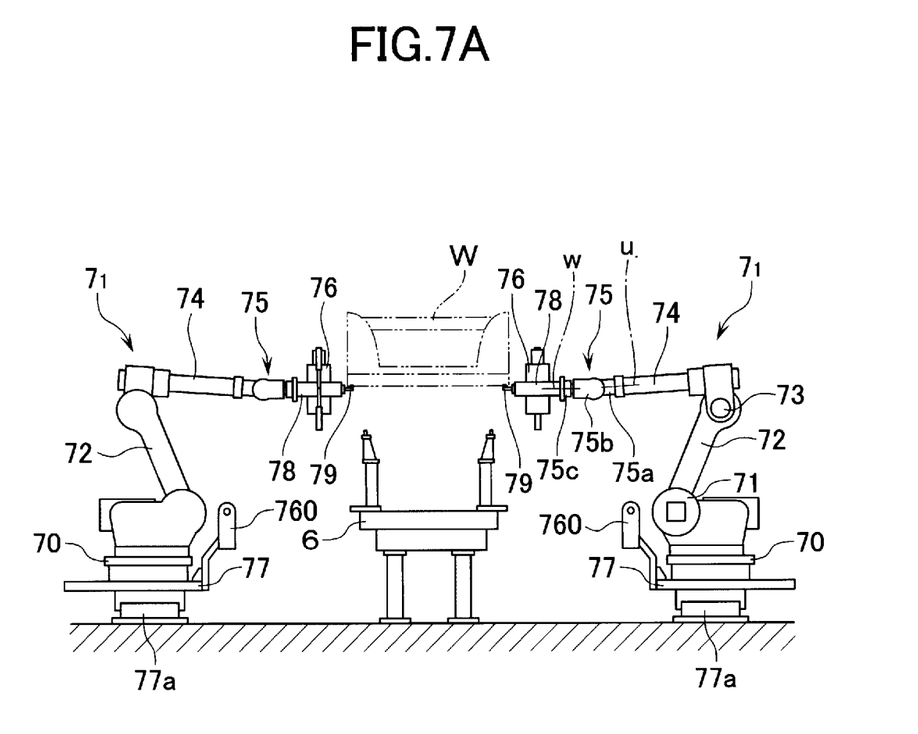
FIG. 7A is a front view as seen from the direction of an arrow VII in FIG. 6, showing the state of the dual-purpose welding robot at the time of transporting the floor

In more detail, each of the rotary bases 70 of the first and the second welding robots $7_1$, $7_2$ is mounted on a travel base 77 which is self-propelled along a track 77a laid out from the side portion of the floor assembly station ST1 to the side portion of the feeding station ST2. Each of the welding robots $7_1$, $7_2$ is thus arranged to be movable back and forth between the floor assembly station ST1 and the feeding station ST2. Further, the welding gun 76 is mounted, through a supporting frame 78, on the wrist 75 of each of the first and the second welding robots $7_1$, $7_2$, as explained in more detail hereinafter. In addition, a workpiece receiving member 79 for supporting a part of the floor W is attached to the supporting frame 78. Once the assembling of the floor W has been finished, the floor W is supported at front and rear four positions through the workpiece receiving member 79 of each of the welding robots $7_1$, $7_2$ by the cooperation of the first and the second welding robots on the left and the right sides, respectively, i.e., four welding robots in total, $7_1$, $7_1$, $7_2$, $7_2$ as shown in FIGS. 6 and 7A. In this state, each of the welding robots $7_1$, $7_1$, $7_2$, $7_2$ is moved forward to the feeding station ST2 by the movement of each of the travel bases 77. The floor W is thus transported from the floor assembly station ST1 to the feeding station ST2. The floor W is then mounted on the cart 3 which is in the feeding station ST2.

The wrist 75 of each of the welding robots $7_1$, $7_1$, $7_2$, 72 is made up of: a first wrist member 75a which is coupled to a front end of a second arm 74 so as to be rotatable about a u axis which extends in a longitudinal direction of the second arm 74; a second wrist member 75b which is coupled to the first wrist member 75a so as to be rotatable about a v axis which crosses the u axis at a right angle; and a third wrist member 75c which is coupled to the second wrist member 75b so as to be rotatable about a w axis which crosses the v axis at a right angle.

Figure 8:
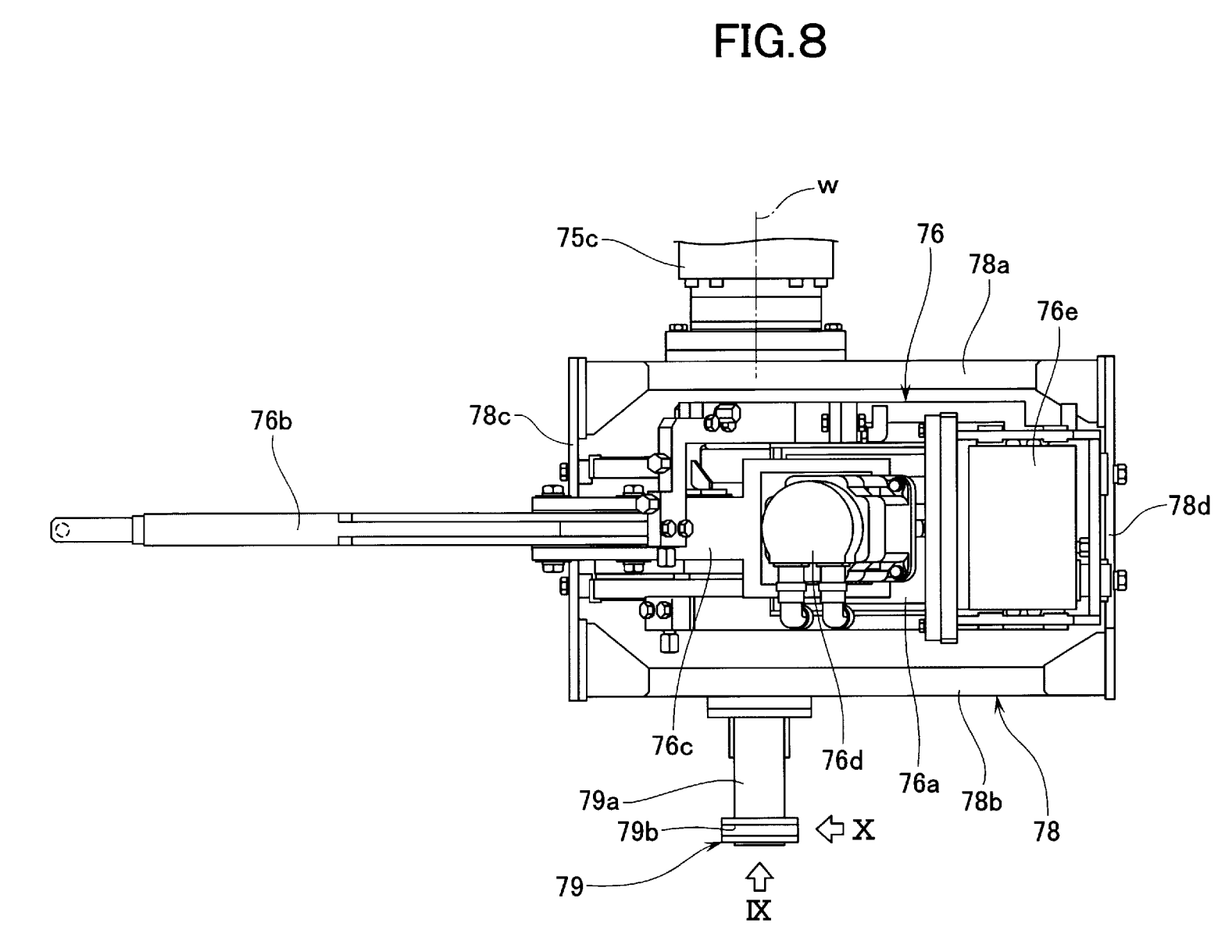
FIG. 8 is a plan view showing the front end of the dual-purpose welding robot.
Figure 9:
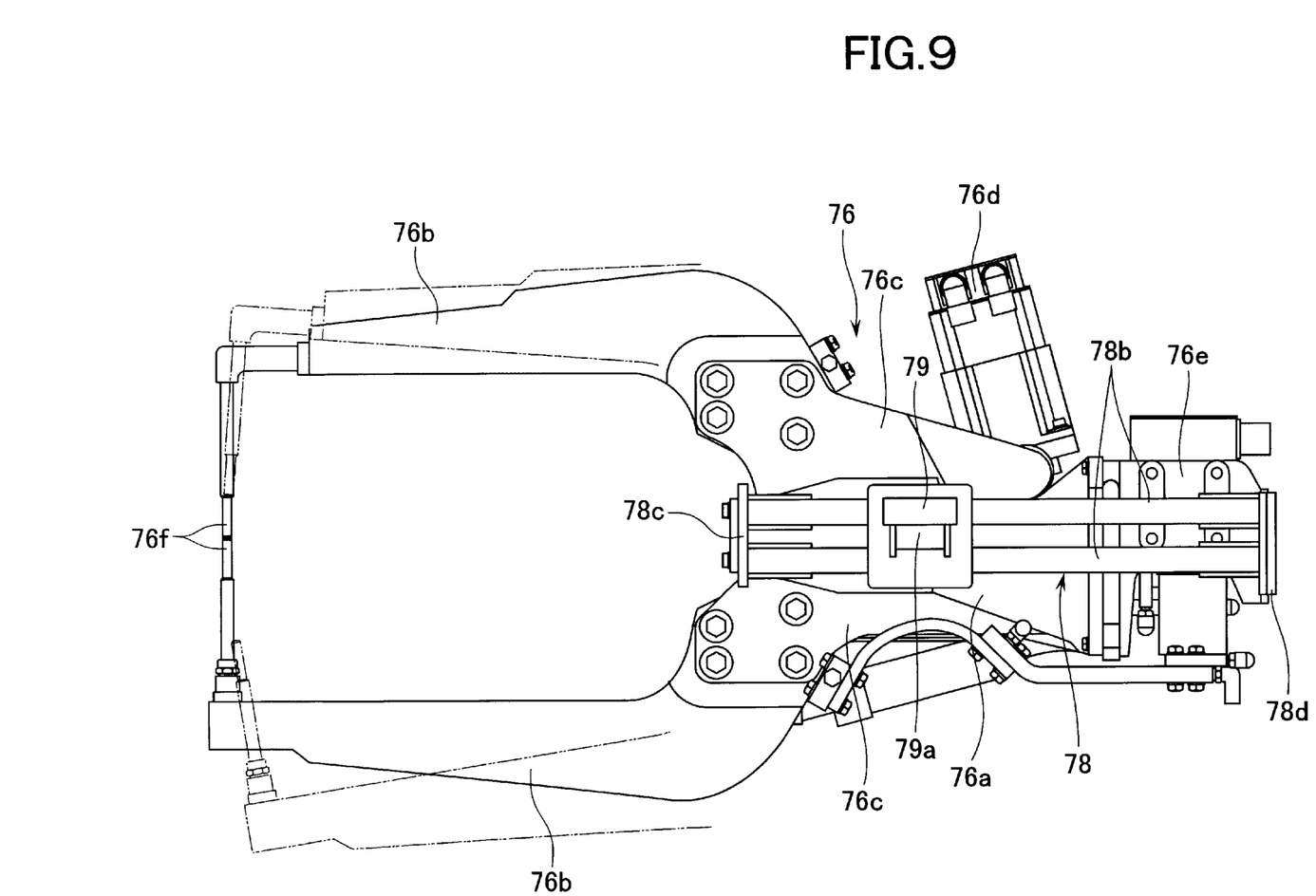
FIG. 9 is a plan view as seen from an arrow IX in FIG. 8.

The supporting frame 78 is formed, as shown in FIGS. 8 and 9, into a square shape which is made up of: a side frame 78a on one side which is coupled to the third wrist member 75c, which is defined as a wrist member at the front end of the wrist, and which is elongated in a direction crossing at a right angle to the w axis which is the axis of rotation of the third wrist member 75c; a side frame 78b which is on the opposite side of, and is parallel to, the side frame 78a; and cross members 78c, 78d which combine both the side frames 78a, 78b together. The welding gun 76 is constituted into an X-shaped gun with a transformer 76e. The welding gun 76 is made up of a gun main body 76a, and a pair of gun arms 76b, 76b which are rotatably supported by the gun main body 76a through arm holders 76c, 76c, both the gun arms 76b, 76b being opened and closed by means of a pressurizing cylinder 76d. The gun main body 76a is positioned between both the side frames 78a, 78b of the supporting frame 78, and both ends of the gun main body 76a are fixed by bolts to the cross members 78c, 78d on both ends of the supporting frame 78. In this arrangement, the welding gun 76 is mounted between both the side frames 78a, 78b in such a manner that the gun arm 76b projects in one longitudinal direction of both the side frames 78a, 78b. In the figures, reference numeral 76f denotes an electrode tip which is mounted on a front end of each of the gun arms 76b, 76b. The welding gun 76 may, of course, be of a C-shape.

The above-described workpiece receiving member 79 is fixed to the outside surface of the side frame 78b on the other side of the supporting frame 78 through a bracket 79a. In this manner, the workpiece receiving member 79 is disposed in a direction which is different from the direction in which the gun arms 76b, 76b project. When the assembling work of the floor W is performed by directing the gun arm 76b toward the floor W, the interference of the workpiece receiving member 79 with the floor W can thus be prevented. Also, when the floor W is supported by directing the workpiece receiving member 79 toward the floor W, the interference of the gun arm 76b with the floor W can be prevented. In addition, the fixing position of the workpiece receiving member 79 is set to that portion of a longitudinal direction of the frame 78b on the other side which coincides with the w axis. According to this arrangement, when the floor W is received or supported by the workpiece receiving member 79, the line of operation of the load toward the workpiece receiving member 79 coincides with a vertical plane which includes the w axis. When the floor W is supported by directing the workpiece receiving member 79 toward the floor W, the wrist 75 extends substantially straight forward, and the vertical plane including the u axis and the vertical plane including the w axis coincide with each other. Therefore, a moment of rotation due to the weight of the floor W will no longer be operated on the first wrist member 75a and the third wrist member 75c, with the result that the stability in supporting the floor W is improved.

Figure 10:
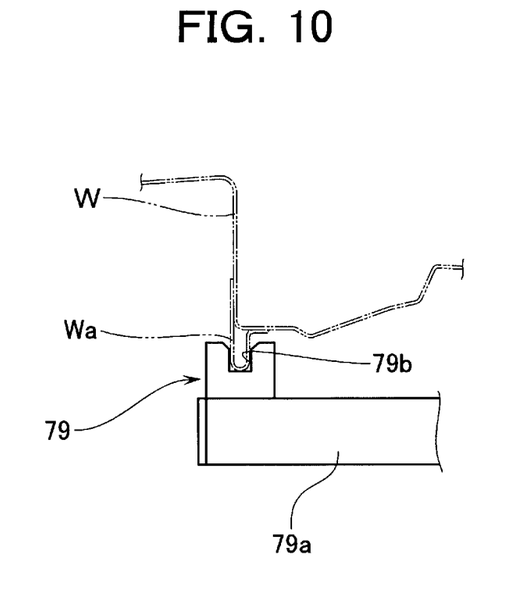
FIG. 10 is a side view of a workpiece receiving member as seen from an arrow X.
Figure 11:
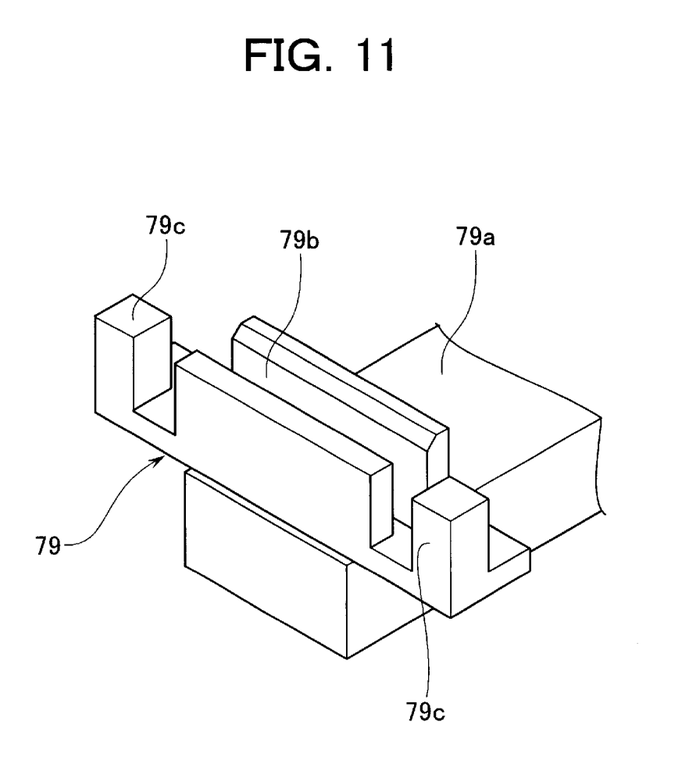
FIG. 11 is a perspective view showing the workpiece receiving member having a function of positioning in two directions.

As shown in FIG. 10, the workpiece receiving member 79 has formed therein a recessed groove 79b which receives therein each of jack-up points Wa which are provided in four points on the lower surface of the floor W. It is thus so arranged that the floor W can be supported by laterally positioning it at the jack-up points Wa by means of the workpiece receiving member 79. The workpiece receiving member 79 of at least one welding robot among a total of four dual-purpose welding robots $7_1$, $7_1$, $7_2$, $7_2$ on the left and right sides is provided, as shown in FIG. 11, with a pair of stoppers 79c, 79c which are vertically provided on both sides as seen in the longitudinal direction of the recessed groove 79b. It is thus so arranged that the corresponding jack-up point Wa can be supported by positioning it in the longitudinal and lateral directions. The floor W can thus be stably supported by the four dual-purpose welding robots $7_1$, $7_1$, $7_2$, $7_2$ at the four jack-up points Wa which are high in rigidity. Possible positional deviations of the floor W during transportation can also be prevented. In transporting the floor W, the welding robot provided with the workpiece receiving member 79, as shown in FIG. 11, which supports the floor W by longitudinally and laterally positioning the jack-up point Wa is made the basis and, in cooperation with the forward movement of this welding robot toward the feeding station ST2, the other welding robots are moved forward toward the feeding station ST2.

It is considered to mount the workpiece receiving member 79 on the side surface of the gun main body 76a of the welding gun 76. The load of the floor W will then operate on the gun main body 76a, resulting in an adverse effect on the welding gun 76. As a solution, in this embodiment, the workpiece receiving member 79 is mounted on the supporting frame 78 as described hereinabove, whereby the load of the floor W is prevented from operating on the gun main body 76a.

Figure 7B:
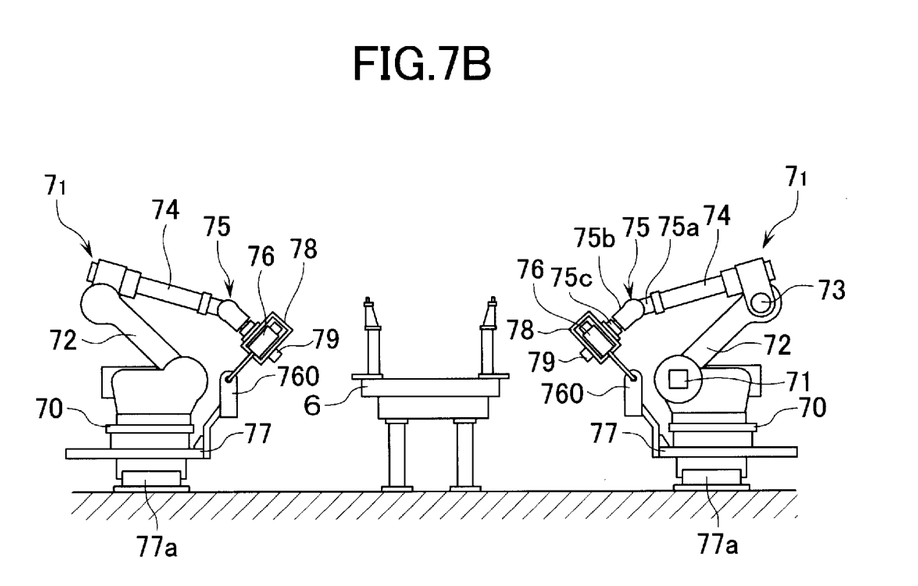
FIG. 7B is a front view showing the state of the dual-purpose welding robot at the time of electrode tip dressing.

In addition, each of the travel bases 77 is provided with an electrode tip dressing device (or an electrode tip dresser) 760. When each of the travel bases 77 is returned to the floor assembly station ST1, each of the welding robots $77_1$, $77_2$ is operated, as shown in FIG. 7B, such that the electrode tip 76f of the welding gun 76 comes into contact with the electrode tip dressing device 760 on each of the travel bases 77, whereby the electrode tip 76f is dressed. According to this arrangement, the time for dressing the electrode tip need not be separately secured, resulting in an improved productivity.

In the above-described embodiment, the electrode tip dressing device 760 is mounted on the travel base 77. However, electrode tip dressing device 760 may also be mounted on a portion which moves together with the travel base 77, e.g., on a base portion of the welding robots $77_1$, $77_2$.

The overhead frame 12 which is disposed to bridge over the other lateral side of the floor assembly station ST1 is supported by: a plurality of supporting columns 12a which are vertically disposed outside the position in which are disposed the track 77a for the dual-purpose welding robots $7_1$, $7_2$ on the other lateral side of the floor assembly station ST1; and a supporting column 12b which is vertically disposed between the positions in which are disposed the second and the third welding robots $7_2$, $7_3$ on the other side of the floor assembly station ST1. Since the supporting rigidity of the front portion of the overhead frame 12 is insufficient with these supporting columns alone, the following arrangement is made. Namely, a bridge portion 12c which extends toward said one lateral side is coupled to the front end portion of the overhead frame 12. The end portion of this bridge portion 12c is supported by supporting columns 12d which are vertically disposed outside the position in which is disposed the track 77a for the dual-purpose welding robots $7_1$, $7_2$ on said one lateral side of the floor assembly station ST1. By disposing the transfer robots $13_1$, $13_2$, $13_3$ for the front component W1, the front floor W2 and the rear floor W3 on this overhead frame 12, the space under the overhead frame 12 is made a free space. In this free space, the dual-purpose welding robots $7_1$, $7_2$ are moved back and forth between the floor assembly station ST1 and the feeding station ST2, to thereby transport the floor W.

It is readily apparent that the above-described apparatus for assembling a floor of a vehicle meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for assembling a floor of a vehicle, comprising:
   a floor assembly station;
   a setting jig which is disposed in said floor assembly station and which sets in position and supports a plurality of workpieces constituting the floor of the vehicle;
   a plurality of welding robots disposed on each lateral side of said floor assembly station, each of said welding robots having a welding gun mounted on an operating end thereof such that a plurality of workpieces on said setting jig are combined by welding to form the floor;
   wherein at least two welding robots on each lateral side of said floor assembly station, i.e., a total of four welding robots, among said welding robots disposed in said floor assembly station, are provided on each operating end thereof with a workpiece receiving member in a certain positional relationship with said welding gun, whereby said four welding robots are constituted into dual-purpose welding robots for both welding and transporting; and
   wherein the floor is transported by cooperation of said dual-purpose welding robots from said floor assembly station to a subsequent station in which a subsequent assembling step is performed, said floor being transported in a state of being supported through said workpiece receiving members at least at four longitudinal and lateral positions of the floor.

2. The apparatus according to claim 1, wherein said workpiece receiving member of each of said dual-purpose welding robots supports each of jack-up points of the floor, and
   wherein said workpiece receiving member of at least one of said dual-purpose welding robots supports a corresponding jack-up point by aligning said corresponding jack-up point in both longitudinal and lateral directions.

3. The apparatus according to claim 1, wherein said welding gun is mounted, through a supporting frame, on a wrist of three-axis construction at a front end of a robot arm of each of said dual-purpose welding robots,
   wherein said supporting frame is made up of: that first side frame on one side which extends in a longitudinal direction at a right angle to an axis of rotation of a wrist member provided at a front end of said wrist and which is coupled to said wrist member; a second side frame on a side opposite to, and parallel with, said first side frame; and cross members which combine both said first and second side frames,
   wherein said welding gun is mounted between said first and second side frames such that a gun arm projects in one longitudinal direction of said first and second side frames, and
   wherein said workpiece receiving member is fixed to an outer side surface of said second side frame.

4. The apparatus according to claim 3, wherein a position of fixing said workpiece receiving member is set such that, when the floor is supported by said workpiece receiving member, an operation line of a load to operate on said workpiece receiving member coincides with a vertical plane which includes the axis of rotation of said wrist member.

5. The apparatus according to claim 1, further comprising:
   travel bases which are provided so as to be reciprocated between said floor assembly station and said subsequent station, each of said dual-purpose welding robots being mounted on each of said travel bases;
   an electrode tip dressing device which is movable together with each of said travel bases,
      wherein, when each of said travel bases is moved from said subsequent station back to said floor assembly station, each of said dual-purpose welding robots is operated such that a welding electrode of each of said welding guns contacts each of said electrode tip dressing devices to thereby dress each of said electrode tips.

6. The apparatus according to claim 1, further comprising:
   transporting means for transporting three workpieces of a front component, a front floor, and a rear floor which constitute the floor of the vehicle into a workpiece feeding section which is located above one lateral side of said floor assembly station;
   an overhead frame which is provided above the other lateral side of said floor assembly station;
   three transfer robots for three workpieces of the front component, the front floor, and the rear floor disposed on said overhead frame in a longitudinally spaced relationship from one another, each of said transfer robots comprising: a rotary base rotatable about a vertical axial line; a first arm coupled to said rotary base through a first joint; a second arm swingably coupled to a front end of said first arm through a second joint; a wrist of three-axis construction at a front end of said second arm; and a workpiece holding device for holding each of the workpieces attached to said wrist,
      wherein each of the workpieces transported into the workpiece feeding section: is picked up by each of said transfer robots; is rotated by the movement of said rotary base of each of said transfer robots into a position which lies above a free space between said workpiece feeding section and said overhead frame; is lowered through said free space for alignment into a predetermined positional relationship with one another in a position right above said setting jig; and is put in position onto said setting jig.

* * * * *